(12) United States Patent
Xu

(10) Patent No.: US 7,900,143 B2
(45) Date of Patent: Mar. 1, 2011

(54) LARGE CHARACTER SET BROWSER

(75) Inventor: Yueheng Xu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2155 days.

(21) Appl. No.: 09/748,895

(22) Filed: Dec. 27, 2000

(65) Prior Publication Data

US 2002/0120654 A1    Aug. 29, 2002

(51) Int. Cl.
*G06F 17/22*    (2006.01)
(52) U.S. Cl. ..................................... 715/269
(58) Field of Classification Search ......... 715/513–517, 715/523–524, 530, 536, 542, 239, 255, 269; 707/10, 100–101, 203; 709/246
See application file for complete search history.

(56) References Cited

U.S. PATENT DOCUMENTS

| | | | |
|---|---|---|---|
| 5,870,084 A | | 2/1999 | Kanungo et al. |
| 6,157,905 A | * | 12/2000 | Powell ........................ 715/536 |
| 6,204,782 B1 | * | 3/2001 | Gonzalez et al. .............. 341/90 |
| 6,397,259 B1 | * | 5/2002 | Lincke et al. ............ 715/501.1 |
| 6,425,123 B1 | * | 7/2002 | Rojas et al. .................. 717/136 |
| 6,446,133 B1 | * | 9/2002 | Tan et al. ..................... 709/245 |
| 6,512,448 B1 | * | 1/2003 | Rincon et al. .............. 340/7.51 |
| 6,601,108 B1 | * | 7/2003 | Marmor ...................... 709/246 |
| 6,631,500 B1 | * | 10/2003 | Kumhyr ...................... 715/531 |
| 6,658,625 B1 | * | 12/2003 | Allen .......................... 715/523 |
| 6,718,519 B1 | * | 4/2004 | Taieb ......................... 715/542 |

OTHER PUBLICATIONS

Roger Molesworth, The Open Interchange of Electronic Documents, Standards & Practices in Electronic Data Interchange, IEEE Colloquium on May 21, 1991, pp. 1-6.*
Apple Computer, Inc., *Programming With The Text Encoding Conversion Manager*, Technical Publication, Apr. 1999, pp. 1-286.
K. Lunde, *CJK.INF*, CJK.INF Version 1.3, Jun. 16, 1995, pp. 1-50.
Zhu, et al., Network Working Group, Request for Comments 1922, "Chinese Character Encoding For Internet Messages," Mar. 1996, pp. 1-27.
Searle, "A Brief History of Character Codes in North America, Europe, and East Asia," Sakamura Laboratory, University Museum, University of Tokyo, 1999, pp. 1-19.
Goldsmith, et al., Network Working Group, Request for Comments 2152, "A Mail-Safe Transmission Format of Unicode," May 1997, pp. 1-15.
Japanese Patent Office, English Language Translation of Inquiry Letter Dated Jul. 11, 2008, pp. 1-3.
Japan Standards Association, "7-bit and 8-bit double byte coded extended Kanji sets for information interchange," JIS X 0213:2000, Jan. 20, 2000, pp. 50-52 and 60-64.

* cited by examiner

*Primary Examiner* — Laurie Ries
*Assistant Examiner* — Chau Nguyen
(74) *Attorney, Agent, or Firm* — Trop, Pruner & Hu, P.C.

(57) ABSTRACT

A large number of characters may be represented by character codes without undue complication. For example, characters that are already represented by Unicode may be handled pursuant to the Unicode system within one 16-bit code. Characters that are not represented by Unicode may be handled in a second fashion. The characters that are not represented by Unicode may be represented by two 16-bit codes.

25 Claims, 3 Drawing Sheets

LARGE CHARACTER SET BROWSER

BACKGROUND

This invention relates generally to Internet browsers and particularly to browsers which support a large number of characters.

Textual data, displayed as printed material or on a computer monitor, is encoded in the form of binary numerical codes. When a given key on a keyboard is stricken, a character code for that key is generated. A computer then uses the character code to select an appropriate character shape from a stored font file listing with the same character code.

English language personal computer systems generally employ a seven bit character code. This code is codified according to the American Standard Code for Information Interchange (ASCII) (ANSIx3.4-1996) that allows for character sets of about 128 items of upper and lower case Latin letters, Arabic numerals, signs and control characters.

The Chinese, Japanese and Korean (CJK) languages have a relatively large number of characters, on the order of hundreds of thousands of characters. These characters far exceed the capacity, in and of themselves, of the 7-bit ASCII character codes.

For example, personal computers in Japan presently utilize the Japanese Industrial Standard (JIS) X0208-1990 that accommodates only 6,879 characters. While this is adequate for many basic functions, it may be insufficient for writing people's names, place names, historical data and other such information.

The existing CJK character sets are not sufficient to provide a wide variety of important information given the available character sets. For example, with the GB-2312 and Big-5 character sets used by the Netscape Communicator web browser, only about 16,000 characters are available.

As a result, the International Organization for Standardization has created a standard called ISO-2022 that outlines how seven bit and eight bit character codes may be structured. The Chinese language version is ISO-2022-CN, set forth in Request for Comments (RFC) 1922 (Network Working Group, 1996).

The so-called Unification Code or Unicode was developed by a number of U.S. software firms to unify all the world's character sets into one large character set. See International Organization for Standardization ISO/IEC 10646-1 (1993) Geneva, Switzerland. Unicode seeks to limit the character set space to sixteen bits or a maximum of 65,536 characters. This character space means each character must be represented by a fixed length code of sixteen bits or two bytes. However, even with Unicode, all of the world's characters, including the hundreds of thousands of CJK characters, can not be expressed using a character set that only allows for 65,536 total characters.

Unicode, for example, does not allow for creating on-line digital libraries in CJK languages. Such libraries may need unabridged character sets that include all characters that have ever been used. In addition, the ability to write the personal and place names of many people and places in CJK countries, is important. As a result, Unicode is inadequate for dealing in a culturally complete way with the CJK character sets. While CJK language users may be able to make do with much smaller character sets, the expressiveness and versatility of the CJK languages may be severely limited by available character codes.

Thus, there is a need for a better way of handling character sets that makes available a larger number of character codes, especially for use in connection with CJK languages.

DETAILED DESCRIPTION

Figure 1:
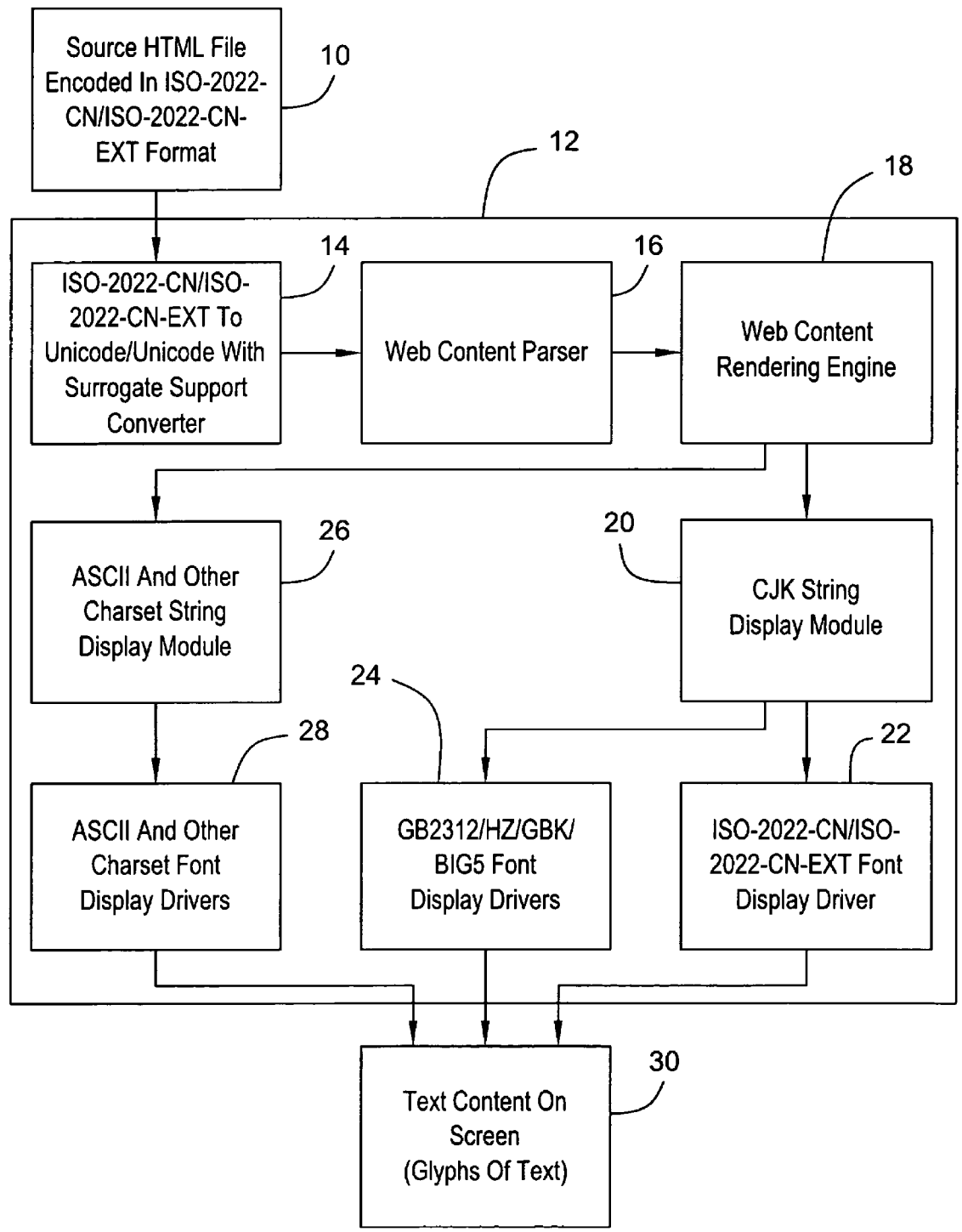
FIG. 1 is a flow chart for software in accordance with one embodiment of the present invention.

A web browser 12, shown in FIG. 1, provides a platform level solution to the need for larger character sets. The web browser 12 may serve as a universal, cross-platform user interface for any web-based application. The browser 12 effectively enables a large character set to support all web-based applications.

A source hypertext markup language (HTML) file is encoded in accordance with the ISO-2022 CN and ISO-2022 CN-extension formats as indicated in block 10. In the browser 12, that file is converted into a Unicode format extended to include support of a surrogate mechanism of Unicode 2.0 (ISO/IEC 10646 and RFC 2152 (1996)). Using the surrogate mechanism of Unicode extends Unicode to a capacity sufficient to recognize a character set of one million unique characters. Since existing Unicode standards use a sixteen bit character length, the sixteen bit value can provide no more than 65,536 characters.

Thus, the ISO-2022-CN and CN extension formats are converted to Unicode with surrogate support as indicated at block 14. Those CJK characters that are already defined in Unicode standard are converted into their sixteen bit Unicode value. The remaining characters that are not defined by the Unicode standard are converted into two sixteen bit values. In one embodiment of the present invention, each of the two sixteen bit values is in the range from 0xD800 to 0xDB00 and from 0xDC00 to 0xDFFF respectively. This conforms to the Unicode definition of a surrogate mechanism without ambiguity.

The browser 12 does the web content parsing, as indicated in block 16, such as HTML parsing. Thereafter, the remaining rendering steps are completed as indicated in block 18.

When the browser 12 is ready to render a particular text string, the browser 12 loops for each of the characters in the string. For CJK characters, a first search seeks fonts in known CJK font libraries as indicated in block 20. The known CJK font libraries include Guo-jiu Biao-zhun ("Coding of Chinese Ideogram Set for Information Interchange Basic Set", GB-2312-80), Big-5 (Institute for Information Industry, "Chinese Coded Character Set in Computer," March 1984), GBK ("Information Technology" Universal Multiple-Octet Coded Character Sets, GB 13000) and GB18030 libraries. For those rare characters that are not included in the known CJK font libraries, the rendering engine searches for the font libraries that cover a larger character set. The appropriate font display drivers are used as indicated in blocks 22 and 24.

By using the ISO-2022 converter to encode the HTML content, rather than directly encoding into Unicode, the seven bit encoding mechanism may be used. The use of the seven bit mechanism makes it less likely that the CJK characters will be truncated by existing or future communication infrastructure networks such as the Internet. The seven bit information may be retained, no matter how it is transmitted, as characters for terminal display, as file content, as e-mail content or as web content. As indicated in block 30, the text content may then be displayed on a display screen.

When CJK characters are not utilized, the normal ASCII character strings may be utilized as indicated in block 26. Then, the ASCII character set font display drivers may be utilized as indicated in block 28.

Figure 2:
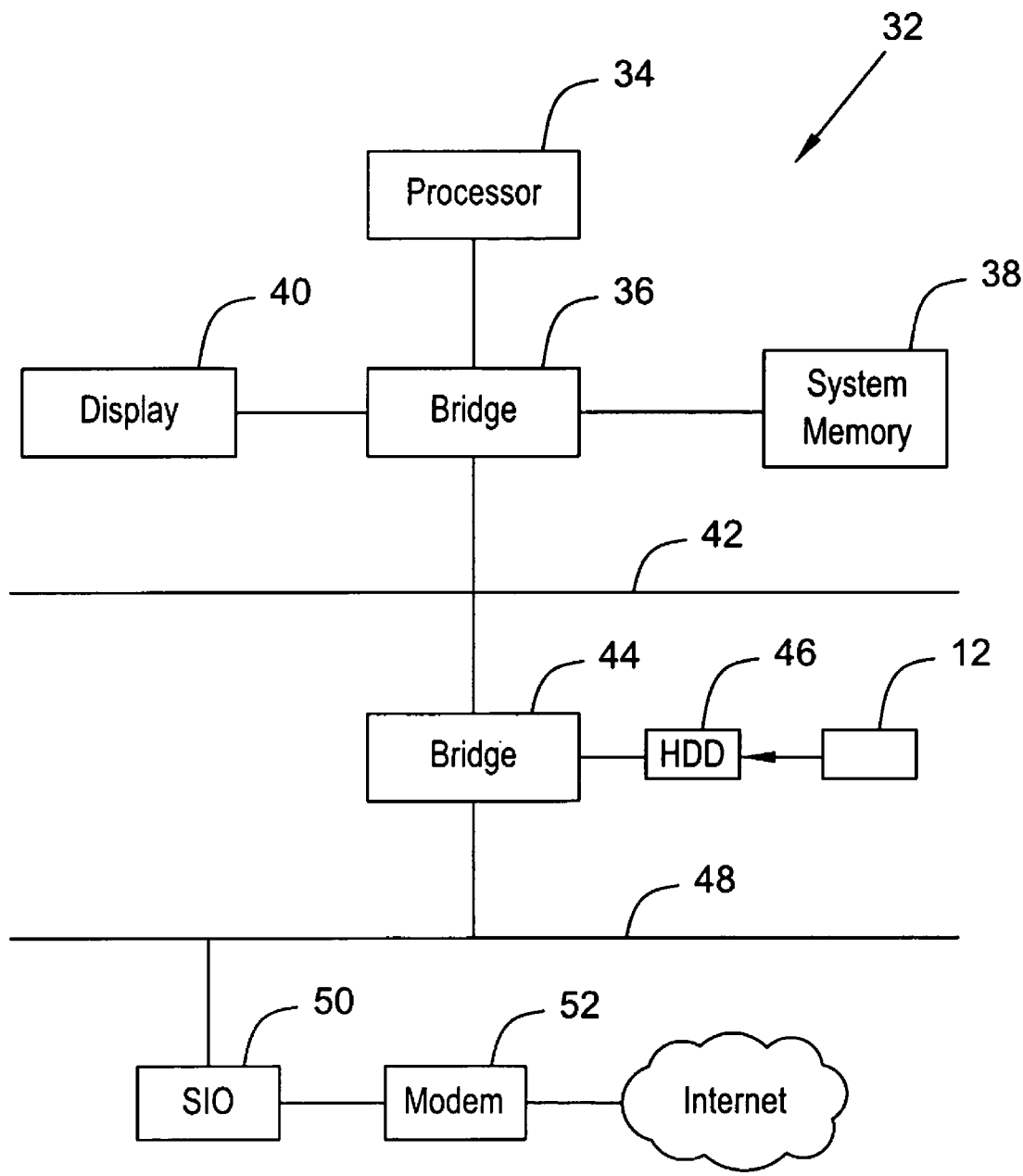
FIG. 2 is a block diagram of hardware for implementing one embodiment of the present invention.

Turning next to FIG. 2, a processor-based system 32 may be in the form of a desktop computer, a laptop computer, a handheld computer, an appliance such as a cellular phone, a set-top box or the like. A processor 34 is coupled to a bridge 36. The bridge 36 is coupled between system memory 38 and a display 40. The display 40 may be a computer monitor, a liquid crystal display or even a television receiver.

The bridge 36 is also coupled to a bus 42 which couples another bridge 44. The bridge 44 may be coupled to a hard disk drive 46 or other storage device. Other possible storage devices include a flash memory and a rewritable digital versatile disk drive. The storage 46 stores the browser 12 prior to execution. Upon execution the browser 12 is transferred to the system memory 38.

The bridge 44 is also coupled to another bus 48. The bus 48 may couple a serial input/output (SIO) device 50. The SIO device 50 may connect to a modem 52 which provides for Internet access for the processor-based system 32.

A Chinese web page content is composed of English HTML tags and Chinese text strings encoded according to a known Chinese character set standard. When the web page is read into the browser, all of its content, including English tags and encoded Chinese text strings are first converted into Unicode text strings. This Unicode text string is then parsed by a HTML parser and a Document Object Model is built to represent that abstract data structure of a web page. Then a rendering engine is applied to walk through the Document Object Model to visit and render each element of the page using the formats and fonts associated with the HTML tags.

During the rendering process, the rendering engine will render one Unicode character at a time. For each particular Unicode character, the rendering engine runs a fast check against an availability index matrix of that font file to see if the font for a given Unicode character is available in a given font file. If the character does not exist in the font file, the rendering engine looks for the next font file to search for a font that is as close to the style as possible.

When a font is found that corresponds to the character, the Unicode of that character is converted back to a national character set encoding, and the value of this encoding is used to index the offset of this character's font bytes in a given font file. Then, the rendering engine fetches those font bytes and generates a glyph image for that character in a given location calculated by a layout engine.

During this process, there are two steps where there is a character set conversion. One step is converting the web page source into Unicode before it gets parsed. The other step is converting each Unicode character in a text string to its character set encoding standard so that its value can be used as an index to fetch font information in a font file.

For example, if the source web page is an HTML page whose Chinese character content is encoded in GBK encoding, then, when the web page is read into the browser, the English HTML tags and the Chinese text strings in GBK encoding go through a Unicode converter, where each Chinese character (a 16-bit GBK code) is converted to Unicode by a straightforward one to one mapping table. The GBK codes themselves are in contiguous blocks. Therefore, the mapping table is a one-dimensional array of a size of about 21,000 entries and the GBK code can be used as the index into this array after a simple calculation. This process is efficient and involves storing an array of 2x21,000 bytes. There is no complicated search involved.

To render the character which is now encoded as Unicode, a font file is indexed using the Unicode directly, or the Unicode is converted back to another encoding which has a font file associated with it. For Chinese characters, because the Unicode does not represent Chinese characters in one contiguous block, but the fonts are arranged in a contiguous block, following the layout order of a particular standard. In this case, the browser needs to convert the Unicode character back to one of the standards.

However, this conversion of Unicode to a standard like GB2312 or BIG5, or GBK can not be done using the straightforward array indexing involved when converting GBK to Unicode. Another mapping table may be created which has the size of the whole Unicode standard or a reverse conversion is done through a search of the GBK to Unicode mapping table.

For browsers that support about 21,000 Chinese characters and encode Chinese using GBK, the GBK to Unicode mapping table is about 2x21,000 bytes, and the Unicode to GBK mapping table would have a size of about 2x65,000 bytes.

A browser that supports 100,000 Chinese characters, encoded either in ISO-2022-CN-EXT or GB 18030, needs a mapping table to Unicode (using a surrogate area) that has a size of about 4x100,000 bytes. A reverse mapping table would have a size of about 4x1,000,000 bytes because the Unicode surrogate has a range of about 1,000,000. Here the 4x is used instead of 2x because the Unicode surrogate area has four bytes for each character it represents.

To avoid the huge reverse mapping table that maps the Unicode back to the ISO-2022-CN-EXT or GB18030, the original ISO-2022-CN-EXT to Unicode mapping table (or GB18030 to Unicode mapping table) is searched to do a reverse mapping. This just trades off processor speed with memory.

The conversion problem introduced with Unicode is that the Chinese characters are not allocated consecutively in Unicode in the same order as in national character set standards. The Unicode surrogate area may be used in a way that the majority of the 100,000 Chinese characters have a contiguous layout in the Unicode surrogate area. A huge mapping table or processor intensive search for the reverse conversion may not be needed in some embodiments. At the same time, the backward compatibility with Chinese characters whose Unicode values are still in the regular 16-bit Unicode range (those not in the surrogate area) may be preserved.

For a web page whose Chinese characters are encoded according to ISO-2022-CN-EXT, where the Chinese characters are arranged in several 95x95 planes, those 100,000 Chinese characters may be arranged in twelve planes, each plane having 95 rows (0x20, 0x21, . . . , 0x7f) and 95 columns (0x20, 0x21, . . . , 0x7f).

These planes are the same as these ISO-2022 planes. Each plane has 9025((0x7f−0x20)x(0x7f−0x20)=95x95) characters. Twelve planes hold all of the Chinese characters. Sixteen planes hold about 150,000 characters, which is more than all the possible CJK and Vietnamese characters added together.

In the surrogate area of Unicode, the planes may be laid out so that the mapping between the plane of 95x95 characters and the Unicode is simple and straightforward without needing huge mapping tables or complicated search algorithms. Thus, planes may be mapped consecutively into a consecutive area of the Unicode surrogate area. For example, the first plane of 95x95 characters may be mapped to the first 95 rows of the surrogates, with identical (row, column) relations between each plane and the surrogate area. The columns in a plane may be mapped to the first 95 columns of the surrogate area. The second plane of 95x95 characters may be mapped to the second 95 rows of the surrogates, with identical (row, column) relations between the plane and the surrogate area. The columns in the plane are mapped to the first 95 columns of the surrogate area.

The surrogate area has 1024 rows in total from 0xD800 to 0xDBff. So 95 columns can hold 97280(1024x95) characters in total, which is a little more than ten planes, each plane of 9025 characters. In other words, with ten planes of Chinese characters to an implementation, we need to map them into 10x95=950 rows of the surrogate area, to support 90,250 characters. With those existing Chinese characters in the regular GBK area (they are mapped to the 16-bit Unicode area), more than 100,000 characters are supported.

The plane number, row number and column number (PRC) may be mapped to the surrogate area in a very simple way in one embodiment. In Unicode terminology, the rows and columns in the surrogate area are called High Surrogate and Low Surrogate respectively. From a character in a plane, row and column, its surrogate area allocation is:

High Surrogate=Planex95+row number
Low Surrogate=column number.

The reverse mapping algorithm may be equally simple. For a known Unicode character in the surrogate area, its plane number, row number and column number in that plane are as follows:

Plane=(High Surrogate−0xD800) %95
Row=(High Surrogate−0xD800)mod 95+0x20
Column=(Low Surrogate−0xDC00)+0x20

This layout arrangement is Unicode compliant and backward compatible. It does not overlap the existing Unicode allocation in the 16-bit area. The newly introduced characters come with no mapping tables and need no complicated conversion algorithm. Either addressing mode (plane, row, column) or (High Surrogate, Low Surrogate) can be used directly for indexing the font for this character in a font file during screen rendering or printing. Systems can be incrementally implemented. Any vendor can reduce or increase the number of supported planes without interfering with the conversion, rendering or other processing of other characters. For example, one vendor may only want to implement one or more planes of 95x95 characters in addition to the 16-bit GBK and 16-bit Unicode implementation. So that vendor can support about 29,000 characters, which is enough to support all the 27,000 characters that have been defined in the GB 18030 standard.

With the mapping tables, the font files can also be arranged in a layout that is easy to use. In other words, because the characters themselves are in contiguous blocks, both inside each plane of 95x95 characters, as well as their representation in the Unicode surrogate area, the font retrieval mechanism can be designed so that the screen rendering and printer output of a character is done when the source HTML page has been parsed into strings of Unicode characters. For Unicode characters within the 16-bit range, a hash function may be used to check a 64K matrix to see if a particular character is available in a particular national character set and its related font file. If it is, that font is used. If not, the character may be searched for in the next national character set. If a user has a preference, then a default font searching mechanism can be overwritten.

For Unicode characters within the surrogate area, the browser looks for a set of new font files. In this set of font files, each font file has fonts for those characters in a given plane (of 95x95 characters). Each Unicode character in the surrogate area knows the location of its original plane number, row number and column number and therefore the browser knows the font file to search for the font. Within a given character plane, the font for each character is arranged in the same order as the (row, column) value of this Unicode character. Since a very simple Unicode to row, column conversion may be used for those characters in the surrogate area, the font for each character is also arranged in the same order as the surrogate value pairs of the Unicode character.

In summary, the font files are divided into planes, each plane having fonts for 95x95 characters in one embodiment. The font for a particular character can be located directly from its (plane, row, column) values, or from its surrogate Unicode value with a simple calculation.

For example, for a bit-mapped 14x16 font, which takes 28 bytes, for a character in plane X, row Y and column Z, we will have a font file name such as FontPlaneX. Inside this font file, the starting byte of the font for the character is 28*(Y*95+Z) if we assume that the rows and columns are counted from 0 to 94.

ISO-2022-CN and ISO-2022-CN-EXT define a mechanism to encode the character sets, listed in the left column below, using the character set designated sequences shown in the right column below:

| Character Set | Character Set Designator Sequences | | | |
|---|---|---|---|---|
| GB2312 | 1B | 24 | 29 | 41 |
| CNS 11643-1992 plane 1 | 1B | 24 | 29 | 47 |
| CNS 11643-1992 plane 2 | 1B | 24 | 2A | 48 |
| ISO-IR-165 | 1B | 24 | 29 | 45 |
| CNS 11643-1992 plane 3 | 1B | 24 | 2B | 49 |
| CNS 11643-1992 plane 4 | 1B | 24 | 2B | 4A |
| CNS 11643-1992 plane 5 | 1B | 24 | 2B | 4B |
| CNS 11643-1992 plane 6 | 1B | 24 | 2B | 4C |
| CNS 11643-1992 plane 7 | 1B | 24 | 2B | 4D |

In a given text string, if an application sees one of these character set designator sequences, it switches the mode to interpret the subsequent text strings so that every two bytes are combined as a single character in the character set corresponding to the character set designator sequence. In order to encode more than 100,000 characters, the last two numbers of above character set designator sequence may be extended in one embodiment:

| Character Set | Character Set Designator Sequences | | | |
|---|---|---|---|---|
| New plane 0 | 1B | 24 | 71 | 41 |
| New plane 1 | 1B | 24 | 71 | 42 |
| New plane 2 | 1B | 24 | 71 | 43 |
| New plane 3 | 1B | 24 | 71 | 44 |
| New plane 4 | 1B | 24 | 71 | 45 |
| New plane 5 | 1B | 24 | 71 | 46 |
| New plane 6 | 1B | 24 | 71 | 47 |
| New plane 7 | 1B | 24 | 71 | 48 |
| New plane 8 | 1B | 24 | 71 | 49 |
| New plane 9 | 1B | 24 | 71 | 50 |
| New plane 10 | 1B | 24 | 71 | 51 |
| New plane 11 | 1B | 24 | 71 | 52 |
| New plane 12 | 1B | 24 | 71 | 53 |

Figure 3:
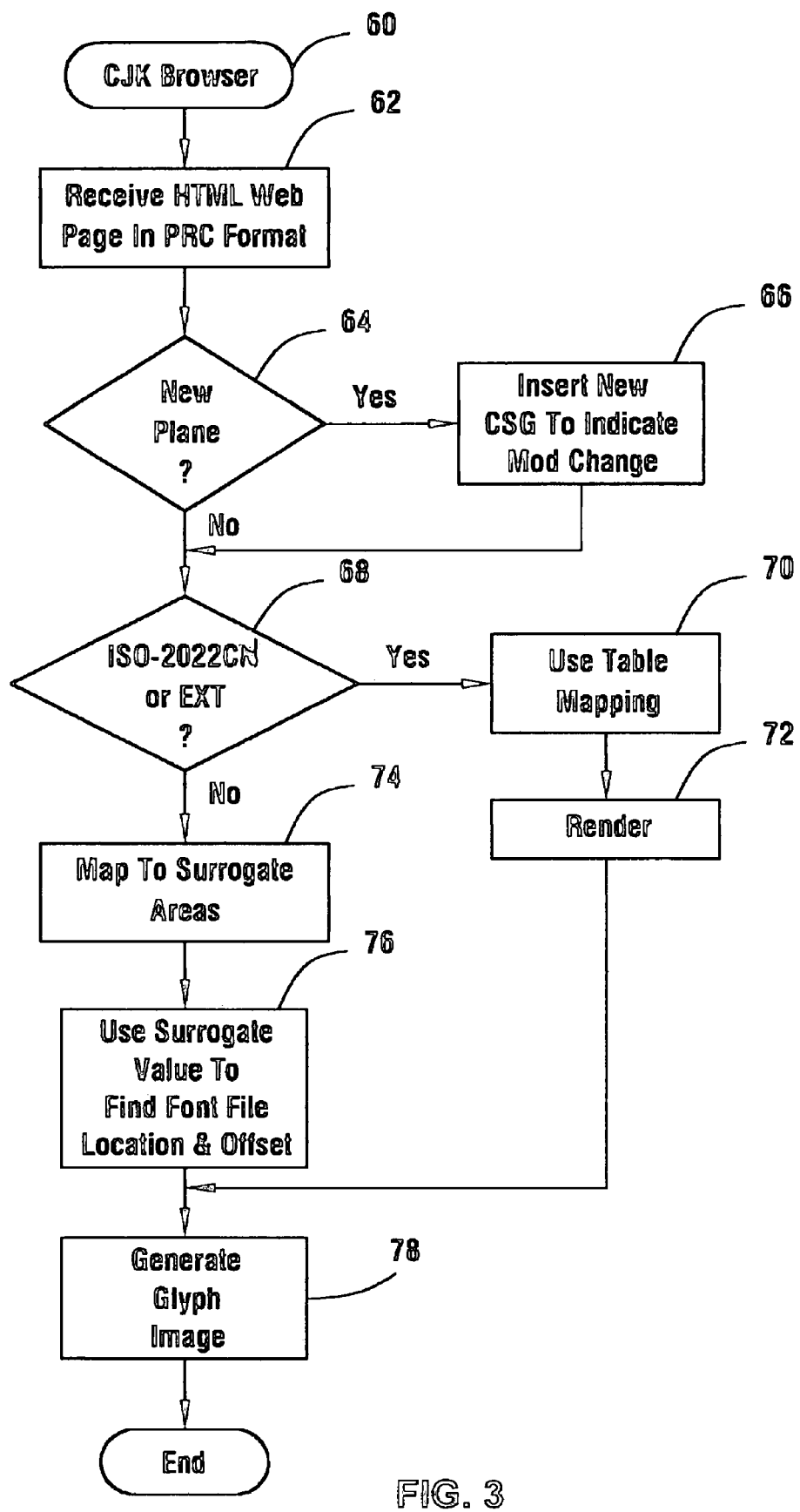
FIG. 3 is a flow chart for software in accordance with one embodiment of the present invention.

According to FIG. 3, the software 60 for implementing a browser 12 may begin by receiving an HTML web page in the plane, row or column (PRC) format as indicated in block 62. The plane is implicitly represented by the character set designator in the beginning of the 10 text string and the row and column are represented by every two bytes in the text string.

Whenever a character set plane is changed, as determined at diamond 64, a new character set designator (CSG) is inserted to indicate a MOD change as indicated in block 66. For characters that are defined by the ISO-2022-CN and ISO-2022-CN-EXT, as determined at diamond 68, table mapping may be used to map its 16-bit Unicode value as indicated in block 70. Thereafter, a rendered step is completed as indicated in block 72.

For a browser that supports 100,000 or more characters, those newly defined and encoded characters are mapped into the surrogate area as indicated in block 74. For Unicode characters in the surrogate areas, the surrogate value may be used to calculate the original values of plane, row and column. The browser is then directed to find its file location and the offset of a particular character's font bytes inside a font file as indicated in block 76. The glyph image is then generated as indicated in block 78 for either the ISO-2022-CN-EXT situation or the extended situation mapped to the surrogate areas.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a file including characters in a computer system;
   converting the characters of said file to a first code format having a double-byte length if the characters are of a first type;
   converting the characters of said file to a second code format having a multiple double-byte length if said characters are of a second type; and
   displaying the characters of the file using the first code format or the second code format.

2. The method of claim 1 including receiving a web page in a plane, row and column format.

3. The method of claim 2 including checking to determine whether a character set plane is changed.

4. The method of claim 3 wherein if the character set plane is changed, inserting a previously presented character set designator.

5. The method of claim 1 including determining whether the characters in the file are defined according to the first code format.

6. The method of claim 5 wherein if said characters are coded according to said first code format, table mapping Unicode values to said first code format.

7. The method of claim 5 wherein if said first code format is not utilized, using a surrogate area of Unicode.

8. The method of claim 1, further comprising converting the characters to the first code format or the second code format before parsing a web page including the characters.

9. The method of claim 1, wherein displaying the characters comprises converting each converted character into an encoding and indexing into a font file using the encoding to obtain the character.

10. The method of claim 1, wherein the second code format accommodates at least 100,000 characters.

11. An article comprising a storage storing instructions that enable a processor-based system to:
    receive a file including characters;
    convert the characters of the file to a first code format having a double-byte length if the characters are of a first type;
    convert the characters of said file to a second code format having a multiple double-byte length if said characters are of a second type; and
    display the characters of the file using the first code format or the second code format.

12. The article of claim 11 further storing instructions that enable the processor-based system to receive a web page in a plane, row and column format.

13. The article of claim 12 further storing instructions that enable the processor-based system to determine when a character set plane is changed.

14. The article of claim 13 further storing instructions that enable the processor-based system to insert a previously presented character set designator if the character set plane is changed.

15. The article of claim 11 further storing instructions that enable the processor-based system to determine whether the characters in the file are defined according to the first code format.

16. The article of claim 15 further storing instructions that enable the processor-based system to map Unicode values to said first code format if said characters are coded according to said first code format.

17. The article of claim 15 further storing instructions that enable the processor-based system to use a surrogate area of Unicode if said first code format is not utilized.

18. The article of claim 11, further storing instructions that enable the processor-based system to convert the characters to the first code format or the second code format before parsing a web page including the characters.

19. The article of claim 11, wherein further storing instructions that enable the processor-based system to convert each converted character into an encoding and index into a font file using the encoding to obtain the character.

20. The article of claim 19, further storing instructions that if executed enable the processor-based system to use the encoding to access the font file for the characters of the second type arranged in a row and column format.

21. A system comprising:
    a processor; and
    a storage coupled to the processor, the storage storing a browser that is able to receive a file including characters, convert the characters of the file to a first code format having a double-byte length if the characters are of a first type, convert said file to a second code format having a multiple double-byte length if said characters are of a second type, and display the characters of the file using the first code format or the second code format.

22. The system of claim 21 wherein the storage stores instructions that enable the processor to receive a web page in a plane, row and column format.

23. The system of claim 21 wherein said storage stores instructions that enable the processor to map Unicode values to the first code format if the characters are coded according to the first code format.

24. The system of claim 23 wherein said storage stores instructions that enable the processor to use a surrogate area of Unicode if the first code format is not utilized.

25. The system of claim 21, wherein the processor is to convert the characters to the first code format or the second code format before parsing a web page including the characters.

* * * * *